(12) United States Patent
Park et al.

(10) Patent No.: US 12,235,346 B2
(45) Date of Patent: Feb. 25, 2025

(54) RADAR DEVICE OPERATING IN DUAL MODE AND OPERATION METHOD THEREOF

(71) Applicant: ELECTRONICS AND TELECOMMUNICATIONS RESEARCH INSTITUTE, Daejeon (KR)

(72) Inventors: Min Park, Daejeon (KR); Bon Tae Koo, Daejeon (KR); Kyung Hwan Park, Daejeon (KR); Pil Jae Park, Daejeon (KR); Jang Hong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 430 days.

(21) Appl. No.: 17/573,177

(22) Filed: Jan. 11, 2022

(65) Prior Publication Data

US 2022/0244371 A1    Aug. 4, 2022

(30) Foreign Application Priority Data

Jan. 29, 2021    (KR) ........................ 10-2021-0012819

(51) Int. Cl.
G01S 13/536    (2006.01)
G01S 7/35    (2006.01)
G01S 13/58    (2006.01)

(52) U.S. Cl.
CPC ............ G01S 13/584 (2013.01); G01S 7/356 (2021.05); G01S 13/536 (2013.01)

(58) Field of Classification Search
CPC ...... G01S 13/584; G01S 7/356; G01S 13/536; G01S 13/34; G01S 7/285; G01S 7/2883;
(Continued)

(56) References Cited

U.S. PATENT DOCUMENTS 7,183,968 B2    2/2007    Isaji
7,598,903 B2    10/2009    Yang et al.
(Continued)

FOREIGN PATENT DOCUMENTS

JP    2008-532000 A    8/2008
KR    10-1533066 B1    7/2015
(Continued)

*Primary Examiner* — Vladimir Magloire
*Assistant Examiner* — Remash R Guyah

(57) ABSTRACT

Disclosed is a radar device capable of operating in a dual mode, which includes a transmitter that includes a first signal generator that generates a Doppler radar signal and a second signal generator that generates a Frequency Modulated Continuous Wave (FMCW) radar signal, a receiver that receives a reflected signal reflected from a target and converts the reflected signal to a digital signal, a signal processing circuit that processes the digital signal differently depending on the dual mode to output an output signal, a signal analysis circuit that analyzes the output signal, and a controller that controls operations of the transmitter, the receiver, the signal processing circuit, and the signal analysis circuit, and the dual mode includes a first mode in which the first signal generator is activated and a second mode in which the second signal generator is activated.

18 Claims, 8 Drawing Sheets

(58) Field of Classification Search
CPC ........ G01S 7/40; G01S 7/4056; G01S 13/581; H03M 1/12
USPC .......................................................... 342/109
See application file for complete search history.

(56) References Cited

U.S. PATENT DOCUMENTS

| | | | |
|---|---|---|---|
| 8,902,103 | B2 | 12/2014 | Kim et al. |
| 9,971,028 | B2 | 5/2018 | Park |
| 10,036,805 | B2 | 7/2018 | Lee et al. |
| 2007/0115164 | A1 | 5/2007 | Wu et al. |
| 2008/0291078 | A1* | 11/2008 | Hilsebecher ........ B60R 21/0134 342/70 |
| 2019/0044485 | A1* | 2/2019 | Rao ........................ G01S 13/931 |
| 2020/0064461 | A1 | 2/2020 | Hwang et al. |
| 2020/0121215 | A1* | 4/2020 | Hyde ................... A61B 5/6801 |

FOREIGN PATENT DOCUMENTS

| | | |
|---|---|---|
| KR | 10-1896726 B1 | 9/2018 |
| KR | 10-1990118 B1 | 6/2019 |
| KR | 10-2019-0118911 A | 10/2019 |

\* cited by examiner

RADAR DEVICE OPERATING IN DUAL MODE AND OPERATION METHOD THEREOF

CROSS-REFERENCE TO RELATED APPLICATIONS

This application claims priority under 35 U.S.C. § 119 to Korean Patent Application No. 10-2021-0012819, filed on Jan. 29, 2021, in the Korean Intellectual Property Office, the disclosures of which are incorporated by reference herein in their entireties.

BACKGROUND

Embodiments of the present disclosure described herein relate to a portable radar device, and more particularly, relate to a radar device operating in a dual mode and a method of operating the same.

Object detection technology using radio frequency (RF) and microwave radar is being utilized in various fields according to the change of times and the development of technology. A detection radar system that detects a moving object is being used in various fields such as healthcare systems, disaster prevention detection systems (sensor networks), fire surveillance reconnaissance systems, Through the wall radar for rescue systems, positioning detection systems capable of detecting the position of a tracking target within a building from outside the building, and Through-The-Wall Surveillance systems, as well as detecting unmanned moving objects.

In particular, there is a growing demand for the development of equipment that can efficiently detect people and ensure the safety of rescuers in extreme environments such as disasters such as fire, collapse, and earthquake. Such equipment is required to have improved performance while being portable by breaking away from expensive integrated equipment or heavy system. A life detection equipment having a portable or attached type can increase the efficiency of lifesaving at the scene of a disaster. In detail, a life detection radar device is primarily required to have a small size that is easy to carry, and also needs to be able to detect moving objects through obstacles such as collapse debris or walls as well as smoke and flames. In addition, so as to realize a small portable device, it should have low power consumption characteristics with low battery consumption. Therefore, there is a need for schemes for providing a portable radar device that minimizes power consumption.

SUMMARY

Embodiments of the present disclosure provide a radar device that is easy to carry and operates in a dual mode to minimize power consumption, and a method of operating the same.

According to an embodiment of the present disclosure, a radar device capable of operating in a dual mode, which includes a transmitter that includes a first signal generator that generates a Doppler radar signal and a second signal generator that generates a Frequency Modulated Continuous Wave (FMCW) radar signal, a receiver that receives a reflected signal reflected from a target and converts the reflected signal to a digital signal, a signal processing circuit that processes the digital signal differently depending on the dual mode to output an output signal, a signal analysis circuit that analyzes the output signal, and a controller that controls operations of the transmitter, the receiver, the signal processing circuit, and the signal analysis circuit. The dual mode includes a first mode in which the first signal generator is activated and a second mode in which the second signal generator is activated.

According to an embodiment, the controller may include a mode selection circuit configured to select the first mode or the second mode.

According to an embodiment, the first signal generator may include a duty cycle controller. The duty cycle controller may adjust a duty cycle of the Doppler radar signal such that the first signal generator operates in a low-duty mode in the first mode.

According to an embodiment, the receiver may include an analog-to-digital converter that converts the reflected signal into the digital signal. The analog-to-digital converter may sample the reflected signal at a timing corresponding to the duty cycle.

According to an embodiment, the radar device may further include a synchronization controller that synchronizes the timing corresponding to the duty cycle with a sampling timing for sampling the reflected signal.

According to an embodiment, the transmitter may further include a switch selectively connected to the first signal generator or the second signal generator. The switch may be connected to the first signal generator in the first mode or connected to the second signal generator in the second mode by a control signal of the controller.

According to an embodiment, the signal processing circuit may include a first fast Fourier transformer that generates a first bit signal including range information by performing a primary fast Fourier transform on the digital signal, a second fast Fourier transformer that generates a second bit signal including velocity information by performing a secondary fast Fourier transform on the first bit signal, and a processor that receives the first bit signal in the first mode and receives the second bit signal in the second mode.

According to an embodiment, the first fast Fourier converter may transfer the first bit signal to the processor in the first mode, and may transfer the first bit signal to the secondary fast Fourier transformer in the second mode.

According to an embodiment, the processor may detect a set target in response to the first bit signal, and may generate a feedback signal for requesting an activation of the second signal generator when the set target is detected.

According to an embodiment, the feedback signal may be transferred to the second signal generator or may be transferred to the controller to induce an entry into the second mode.

According to an embodiment, the processor may generate the output signal including the range information and the velocity information in response to a second bit signal.

According to an embodiment, the second signal generator may output the FMCW radar signal for a preset time. The signal analysis circuit may include a biometric information measuring circuit that analyzes respiration rate information or heart rate information of the target from the output signal based on the FMCW radar signal.

According to an embodiment of the present disclosure, a transceiver capable of operating in a dual mode, include a transmitter including a first signal generator that generates a Doppler radar signal and a second signal generator that generates a Frequency Modulated Continuous Wave (FMCW) radar signal, and that activates the first signal generator in a first mode to output the Doppler radar signal and activates the second signal generator in a second mode to output the FMCW radar signal, a receiver that receives a reflected signal reflected from a target and converts the reflected signal to a digital signal. The first signal generator may include a duty cycle controller that adjusts a duty cycle of the Doppler radar signal to operate in a low-duty mode in the first mode.

According to an embodiment, the transmitter may further include a switch selectively connected to the first signal generator or the second signal generator. The switch may be connected to the first signal generator in the first mode or may be connected to the second signal generator in the second mode.

According to an embodiment, the transceiver may further include a synchronization controller that synchronizes a timing corresponding to the duty cycle with a sampling timing for converting the reflected signal into the digital signal.

According to an embodiment of the present disclosure, a method of operating a radar device, includes adjusting, in a first mode, a duty cycle of a first RF signal, which is a Doppler radar signal, transmitting the first RF signal to an arbitrary target, receiving a first reflected signal of the first RF signal reflected from the arbitrary target, processing the first reflected signal to obtain first range information associated with the arbitrary target, entering a second mode when it is determined that the arbitrary target is a set target based on the first range information, transmitting, in the second mode, a second RF signal, which is a Frequency Modulated Continuous Wave (FMCW) radar signal, to the set target, receiving a second reflected signal of the second RF signal reflected from the set target, and processing the second reflected signal to obtain second range information and velocity information associated with the set target.

According to an embodiment, the processing of the first reflected signal to obtain the first range information associated with the arbitrary target may include synchronizing a timing corresponding to the duty cycle with a sampling timing of the first reflected signal, converting the first reflected signal into a digital signal depending on the sampling timing, and performing a fast Fourier transform on the digital signal.

According to an embodiment, the processing of the second reflected signal to obtain the second range information and the velocity information associated with the set target may include converting the second reflected signal into a digital signal, generating a first bit signal by performing a primary fast Fourier transform on the digital signal, and generating a second bit signal by performing a secondary fast Fourier transform on the first bit signal.

According to an embodiment, the first bit signal may include the second range information, the second bit signal may include the velocity information, and the second range information may have higher accuracy than the first range information.

According to an embodiment, the second RF signal may be transmitted for a predetermined time, and the method of operating a radar device may further include measuring a respiration rate or a heart rate of the set target based on a specific frequency band of the second reflected signal received for the predetermined time.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail such that those skilled in the art may easily carry out the present disclosure.

Figure 1:
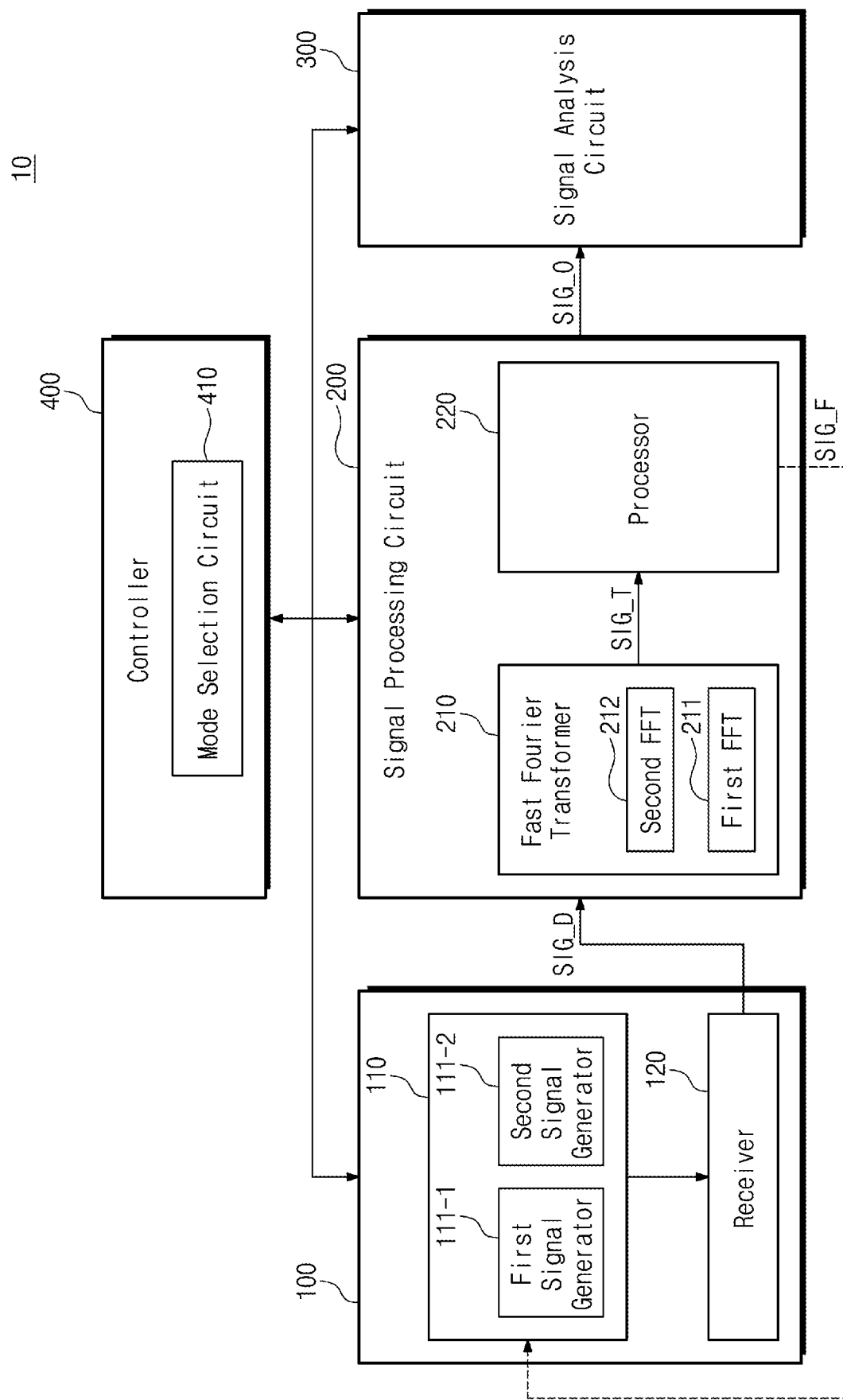
FIG. 1 is a block diagram of a radar device according to an embodiment of the present disclosure.

FIG. 1 is a block diagram of a radar device according to an embodiment of the present disclosure. Referring to FIG. 1, a radar device 10 may include a transceiver 100, a signal processing circuit 200, a signal analysis circuit 300, and a controller 400.

The radar device 10 may operate in a dual mode including a first mode and a second mode. The first mode is a mode for outputting a Doppler radar signal, and may be a mode for activating a first signal generator 111-1. In the first mode, the radar device 10 may adjust a duty cycle of the Doppler radar signal to a specific level or less so as to reduce power consumption, and may obtain rough information associated with a target from a reflected signal of the Doppler radar signal. The radar device 10 may determine whether to enter the second mode through rough information associated with the target.

The second mode is a mode for outputting a Frequency Modulated Continuous Wave (FMCW) radar signal and may be a mode for activating a second signal generator 111-2. In the second mode, the radar device 10 may obtain precise or accurate information associated with the target from a reflected signal of the FMCW radar signal. Therefore, the radar device 10 may first operate in the first mode with low power consumption to detect an arbitrary target, and when the detected arbitrary target is a set target, may operate in the second mode to obtain precise or accurate information.

The transceiver 100 may include a transmitter 110 and a receiver 120. The transmitter 110 may include an RF signal generator 111 that generates a radio frequency (RF) signal. The RF signal generator 111 may include the first signal generator 111-1 generating the Doppler radar signal (hereinafter, referred to as a first RF signal) and the second signal generator 111-2 generating the FMCW radar signal (hereinafter, referred to as a second RF signal). The first signal generator 111-1 and the second signal generator 111-2 may generate Doppler-type signals to easily detect the target even when there are many obstacles around the target, such as in a disaster area.

The first signal generator 111-1 may emit the first RF signal to an arbitrary target. The second signal generator 111-2 may emit the second RF signal to a set target. The receiver 120 may receive a first reflected signal that is the first RF signal reflected from the arbitrary target or a second reflected signal that is the second RF signal that is reflected from the set target. The receiver 120 may convert the first reflected signal or the second reflected signal into a digital signal SIG_D. Hereinafter, a detailed description of the configuration and operation of the transmitter 110 and the receiver 120 will be described with reference to FIG. 2.

The signal processing circuit 200 may include a fast Fourier transformer 210 and a processor 220. The fast Fourier transformer 210 may include a first fast Fourier transformer (hereinafter, referred to as a first FFT) 211 and a second fast Fourier transformer (hereinafter, referred to as a second FFT) 212. The first FFT 211 may perform a primary fast Fourier transform on the digital signal SIG_D. The second FFT 212 may perform a secondary fast Fourier transform on the digital signal SIG_D on which the primary fast Fourier transform is performed.

The processor 220 may receive a converted signal SIG_T from the first FFT 211 or the second FFT 212 depending on the first mode or the second mode. The converted signal SIG_T may include specific information associated with the target. The processor 220 may determine whether to enter the second mode from the specific information in the first mode, and may provide a feedback signal SIG_F to the transmitter 110 when the entry into the second mode is determined. The processor 220 may provide an output signal SIG_O for outputting specific information in the second mode to the signal analysis circuit 300. Hereinafter, a detailed description of the configuration and operation of the signal processing circuit 200 will be described with reference to FIG. 3.

The signal analysis circuit 300 may receive the output signal SIG_O and may analyze the output signal SIG_O. The signal analysis circuit 300 may obtain final information associated with the target from the output signal SIG_O. The signal analysis circuit 300 may output the final information associated with the target through a user interface (not illustrated).

For example, the final information associated with the target may include information associated with a respiration rate and a heart rate of the target. Since a living human body emits a bio-signal related to respiration or heartbeat, the signal analysis circuit 300 may analyze the bio-signal from the reflected signal and may detect the target.

The controller 400 may control operations of the transceiver 100, the signal processing circuit 200, and the signal analysis circuit 300. The controller 400 may include a mode selection circuit 410. The mode selection circuit 410 may generate a selection signal for the first mode or the second mode.

The mode selection circuit 410 may generate a first mode selection signal when the radar device 10 is turned on. When the first selection signal is generated, the controller 400 may control the operations of the transceiver 100 and the signal processing circuit 200 depending on the first mode. The mode selection circuit 410 may generate a second mode selection signal when the set target is detected. When the second selection signal is generated, the controller 400 may control the operations of the transceiver 100, the signal processing circuit 200, and the signal analysis circuit 300 depending on the second mode.

Hereinafter, detailed descriptions of the operations of the transceiver 100, the signal processing circuit 200, and the signal analysis circuit 300 depending on the first mode and the second mode will be described below.

Figure 2:
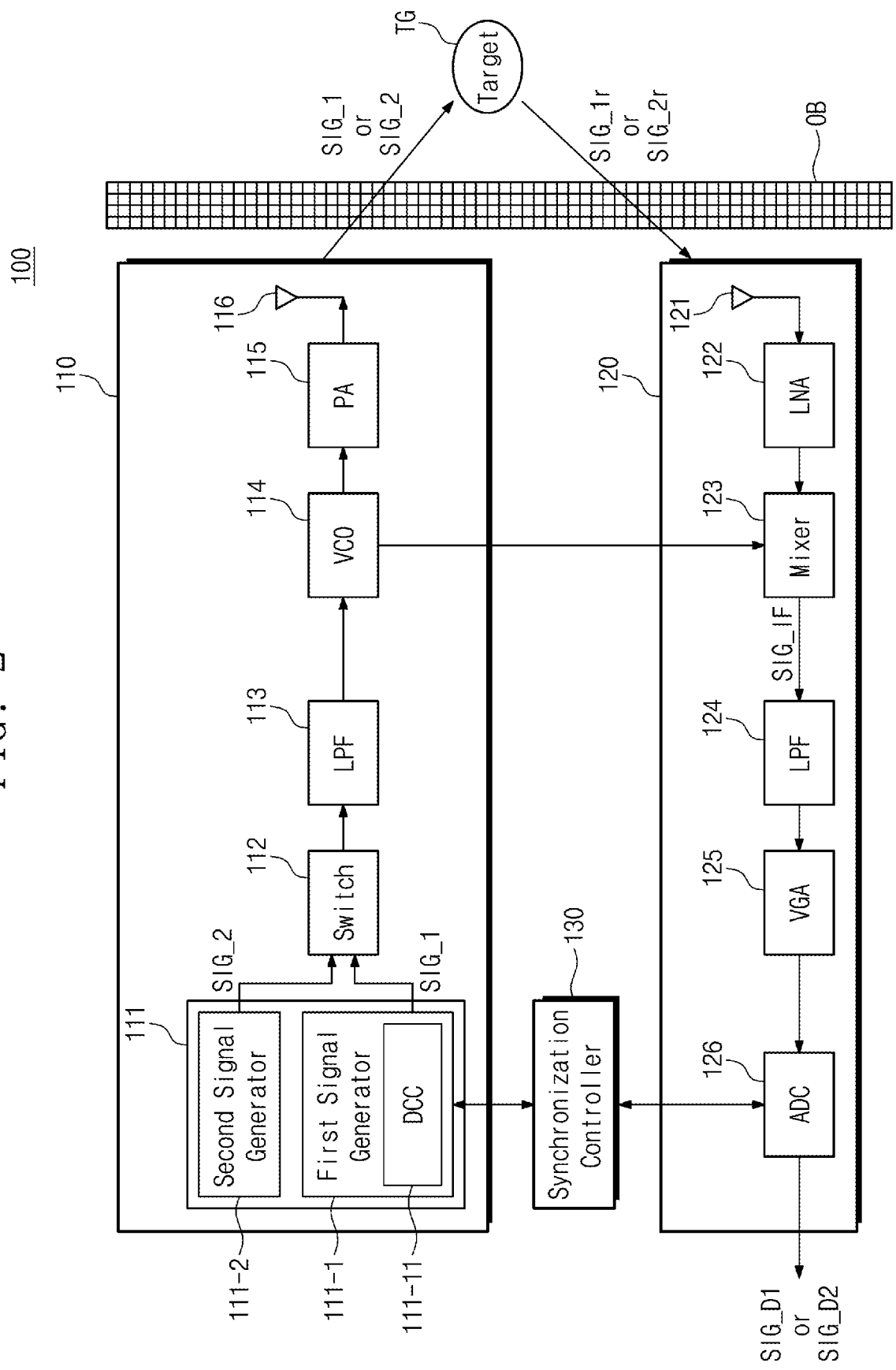
FIG. 2 is a block diagram of a transceiver according to FIG. 1.

FIG. 2 is a block diagram of a transceiver according to FIG. 1. Referring to FIGS. 1 and 2, the transceiver 100 may include the transmitter 110, the receiver 120, and a synchronization controller 130.

The transmitter 110 may include the RF signal generator 111 including the first signal generator 111-1 and the second signal generator 111-2, a switch 112, a first low pass filter 113, a voltage controlled oscillator 114, an amplifier 115, and a transmission antenna 116.

The first signal generator 111-1 may generate the first RF signal SIG_1 in the first mode. The first signal generator 111-1 may generate the first RF signal SIG_1 in response to the first mode selection signal from the mode selection circuit 410. The first signal generator 111-1 may include a duty cycle controller 111-11.

The duty cycle controller 111-11 may adjust the duty cycle of the first RF signal SIG_1. The duty cycle controller 111-11 may operate in a low duty mode by adjusting the duty cycle of the first RF signal SIG_1 to be less than or equal to a reference value. For example, the duty cycle may be adjusted to 10% or less. That is, the first RF signal SIG_1 may be a Doppler radar signal whose duty cycle is adjusted to be less than or equal to a reference value. Accordingly, the first mode may be referred to as a low duty mode.

The second signal generator 111-2 may generate the second RF signal SIG_2 in the second mode. The second signal generator 111-2 may generate the second RF signal SIG_2 in response to the feedback signal SIG_F from the signal processing circuit 200. The second signal generator 111-2 may generate the second RF signal SIG_2 in response to the second mode selection signal from the mode selection circuit 410.

The switch 112 may be selectively connected to the first signal generator 111-1 or the second signal generator 111-2 depending on the mode selection signal. In the first mode, the switch 112 may be connected to the first signal generator 111-1 to output the first RF signal SIG_1. In the second mode, the switch 112 may be connected to the second signal generator 111-2 to output the second RF signal SIG_2.

As described above, the RF signal generator 111 and the switch 112 may operate differently according to the first mode and the second mode. However, the configuration of the transceiver 100 except for the RF signal generator 111 and the switch 112 operates similarly in the first mode and the second mode except that types of the transferred RF signal are different. Therefore, hereinafter, the description of FIG. 2 will be described without distinction between the first mode and the second mode for convenience of description.

The first low pass filter 113 may receive the first RF signal SIG_1 or the second RF signal SIG_2 from the switch 112. The first low-pass filter 113 may block a signal component having a higher frequency than a first cutoff frequency in the first RF signal SIG_1 or the second RF signal SIG_2. The first low pass filter 113 may transmit the filtered first RF signal SIG_1 or the filtered second RF signal SIG_2 to the voltage controlled oscillator 114.

The voltage controlled oscillator 114 may generate an analog signal having a reference frequency from the first RF signal SIG_1 or the second RF signal SIG_2. For example, the voltage controlled oscillator 114 may adjust the frequency of the analog signal to a predetermined reference frequency. The first RF signal SIG_1 or the second RF signal SIG_2 passing through the voltage controlled oscillator 114 may be an analog signal having the reference frequency. The voltage controlled oscillator 114 may transmit the first RF signal SIG_1 or the second RF signal SIG_2 having the reference frequency to the amplifier 115 and a mixer 123.

The amplifier 115 may amplify the first RF signal SIG_1 or the second RF signal SIG_2. For example, the amplifier 115 may be a power amplifier (PA) for amplifying the power of the first RF signal SIG_1 or the second RF signal SIG_2. The amplifier 115 may output the first RF signal SIG_1 or the second RF signal SIG_2 of the amplified signal to the outside through the transmission antenna 116.

The transmission antenna 116 may output the first RF signal SIG_1 or the second RF signal SIG_2 to a target TG. The target TG may be an arbitrary target according to the first mode, or may be a set target according to the second mode. For example, the target TG may be a person. An obstacle OB may exist between the transceiver 100 and the target TG. The Obstacle OB may be walls of various buildings, such as brick walls, concrete walls without reinforcement, walls made of plywood, plastic or wood, etc. According to an embodiment, the obstacle OB may be may be a thick smoke, a haze, a fog, etc.

The receiver 120 may include a receiving antenna 121, a low noise amplifier 122, the mixer 123, a second LPF 124, a variable gain amplifier 125, and an analog-to-digital converter 126.

The receiving antenna 121 may receive a first reflected signal SIG_1r from which the first RF signal SIG_1 is reflected or a second reflected signal SIG_2r from which the second RF signal SIG_2 is reflected from the target TG. The receiving antenna 121 may transmit the first reflected signal SIG_1r or the second reflected signal SIG_2r to the low noise amplifier 122.

The low noise amplifier 122 may amplify the first reflected signal SIG_1r or the second reflected signal SIG_2r to reduce a noise figure. The low noise amplifier 122 may transmit the first reflected signal SIG_1r or the second reflected signal SIG_2r to which noise corresponding to the noise figure is added to the mixer 123.

The mixer 123 may receive the first reflected signal SIG_1r or the second reflected signal SIG_2r from the low noise amplifier 122, and may receive the first RF signal SIG_1 or the second RF signal SIG_2 that has the reference frequency from the voltage controlled oscillator 114. The mixer 123 may mix the first reflected signal SIG_1r and the first RF signal SIG_1 or may mix the second reflected signal SIG_2r and the second RF signal SIG_2 to generate an intermediate frequency signal SIG_IF. The mixer 123 may transmit the intermediate frequency signal SIG_IF to the second LPF 124.

The second LPF 124 may remove a signal component having a higher frequency than a second cutoff frequency from the intermediate frequency signal SIG_IF. The second LPF 124 may transmit the filtered intermediate frequency signal SIG_IF to the variable gain amplifier 125. The variable gain amplifier 125 may control a gain to amplify the intermediate frequency signal SIG_IF. The variable gain amplifier 125 may transmit the amplified intermediate frequency signal SIG_IF to the analog-to-digital converter 126.

The analog-to-digital converter 126 may convert the intermediate frequency signal SIG_IF into a digital signal. The digital signal may include a first digital signal SIG_D1 converted from the first reflection signal SIG_1r or a second digital signal SIG_D2 converted from the second reflection signal SIG_2r. The analog-to-digital converter 126 may sample the first reflected signal SIG_1r at a timing corresponding to the duty cycle set by the duty cycle controller 111-11. The analog-to-digital converter 126 may transmit the first digital signal SIG_D1 or the second digital signal SIG_D2 to the signal processing circuit 300.

The synchronization controller 130 may be connected to the duty cycle controller 111-11 and the analog-to-digital converter 126 to exchange signals with each other. The synchronization controller 130 may synchronize a timing corresponding to the duty cycle with a sampling timing.

Although only one obstacle OB is illustrated in FIG. 2, the number of obstacles OB is not limited thereto. For example, in a disaster area, there may be many obstacles between the transceiver 100 and the target TG. When there are many obstacles around the target TG, in the case of IR-UWB (Impulse Radio Ultra-Wide-Band) radar, since the signal strength is limited in the UWB frequency band due to radio regulations, it may be difficult to detect weak signals such as respiration. Therefore, a Doppler-type signal such as the first RF signal SIG_1 or the second RF signal SIG_2 may be effective in detecting the weak signals in a disaster area.

In addition, a living human body emits bio-signals such as respiration or heartbeat. Since the Doppler signal may be distinguished even when there are many fixed obstacles around the target, such as in a disaster area, it may be most suitable for searching for signals of the human body in a disaster area. Therefore, the portable radar device for lifesaving may use the Doppler signal. However, in the case of human respiration, sampling for a long time may be required for signal analysis and processing when calculating the respiration rate. For example, the radar device may continuously detect a signal for at least 5 seconds, and analyze and process the signal. Accordingly, power consumption may increase. Therefore, the radar device 10 operating in a dual mode may be more suitable than a portable radar device using a single FMCW radar.

Figure 3:
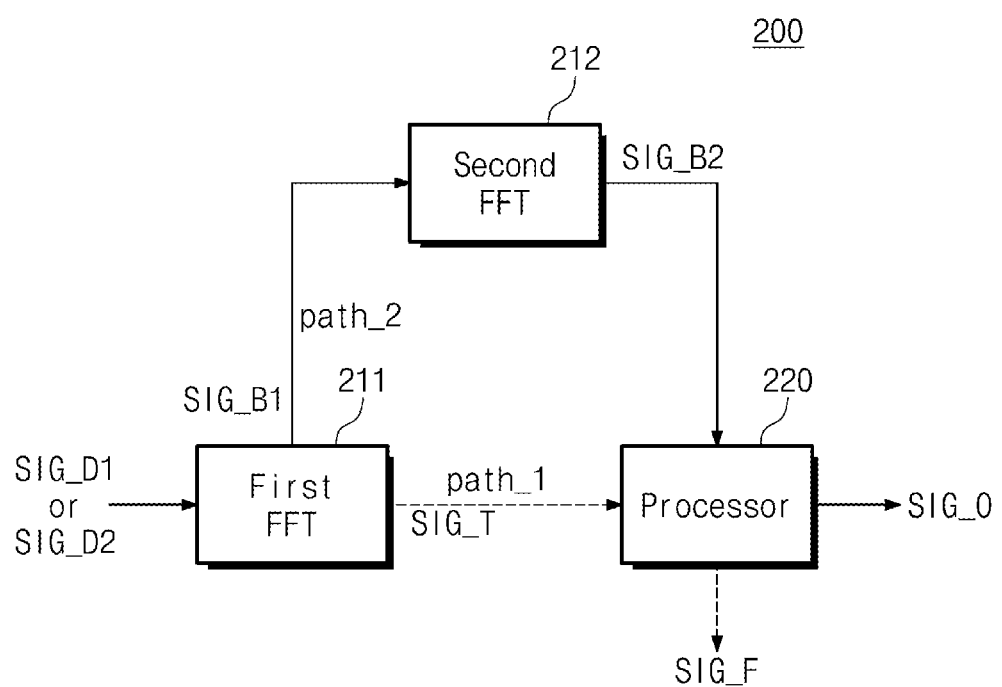
FIG. 3 is block diagram of a signal processing circuit according to FIG. 1.

FIG. 3 is block diagram of a signal processing circuit according to FIG. 1. Referring FIGS. 1 to 3, the signal processing circuit 200 may include the first FFT 211, the second FFT 212, and the processor 220. The signal processing circuit 200 may operate differently depending on the first mode and the second mode.

In the first mode, the first FFT 211 may receive the first digital signal SIG_D1 from the analog-to-digital converter 126. The first FFT 211 may convert the first digital signal SIG_D1 into a transformed signal SIG_T using a fast Fourier transform algorithm. The first FFT 211 may transmit the converted signal SIG_T to the processor 220.

In the first mode, the processor 220 may determine whether to enter the second mode based on the transformed signal SIG_T. The transformed signal SIG_T may include specific information associated with an arbitrary target. For example, the specific information may include range information associated with the arbitrary target. The processor 220 may determine whether the arbitrary target is a set target through the range information.

For example, the processor 220 may identify a range between the radar device 10 and an arbitrary target over time through the range information, and when the arbitrary target moves, may determine that the arbitrary target is the set target. The standard for the set target is not limited to the movement of the target. For example, the processor 220 may identify a shape of the arbitrary target through the range information, and when the shape is similar to a stored shape, the processor 220 may confirm that the arbitrary target is the set target.

In detail, in the first mode, the processor 220 may perform a coarse search for the target TG through the transformed signal SIG_T. The processor 220 may generate the feedback signal SIG_F when the movement of the target TG or the target TG having a shape similar to a stored shape is detected through the coarse search. The feedback signal SIG_F may be a signal that activates the second signal generator 111-2. The processor 220 may provide the feedback signal SIG_F to the second signal generator 111-2.

As described above, in the first mode, the signal processing circuit 200 may process the first digital signal SIG_D1 along the first path path_1. The first path path_1 may include a path through which the transformed signal SIG_T is transferred from the first FFT 211 to the processor 220 and a path through which the feedback signal SIG_F is output from the processor 220.

In the second mode, the first FFT 211 may receive the second digital signal SIG_D2 from the analog-to-digital converter 126. The first FFT 211 may convert the second digital signal SIG_D2 into a first bit signal SIG_B1 by performing a primary fast Fourier transform. The first FFT 211 may transmit the first bit signal SIG_B1 to the second FFT 212. The second FFT 212 may convert the first bit signal SIG_B1 into a second bit signal SIG_B2 by performing a secondary fast Fourier transform. The second FFT 212 may transmit the second bit signal SIG_B2 to the processor 220.

In the second mode, the processor 220 may identify the set target based on the second bit signal SIG_B2 again. The second bit signal SIG_B2 may include specific information associated with the set target. For example, the specific information may include range information and velocity information associated with the set target. The processor 220 may identify again the movement or shape of the set target through the range information and the velocity information.

That is, in the first mode, the processor 220 may perform a fine search for the target TG through the second bit signal SIG_B2. The processor 220 may generate the output signal SIG_O when the movement of the target TG or the target TG having a shape similar to a stored shape is identified through the coarse search. The output signal SIG_O may include specific information associated with the set target. The processor 220 may provide the output signal SIG_O to the signal analysis circuit 300.

As described above, in the second mode, the signal processing circuit 200 may process the second digital signal SIG_D2 along the second path path_2. The second path path_2 may include a path through which the first bit signal SIG_B1 is transferred from the first FFT 211 to the second FFT 212, a path through which the second bit signal SIG_B2 is transferred from the second FFT 212 to the processor 220, and a path through which the output signal SIG_O is output from the processor 220.

The signal processing circuit 200 may set different strategies for each mode by performing signal processing in the first path path_1 or the second path path_2 according to the first mode or the second mode. Since the coarse search according to the first path path_1 is performed in the low duty mode, power consumption may be reduced. In the fine search according to the second path path_2, since a two-stop fast Fourier transform is performed, a lot of information and accurate information about the target TG may be obtained, and thus the weak signals may be detected.

Accordingly, the radar device 10 may preferentially apply the first mode to detect the target through the coarse search. Thereafter, the radar device 10 may apply the second mode to perform full scanning of an area to be detected through the fine search, thereby improving detection performance and reducing power consumption.

Figure 4:
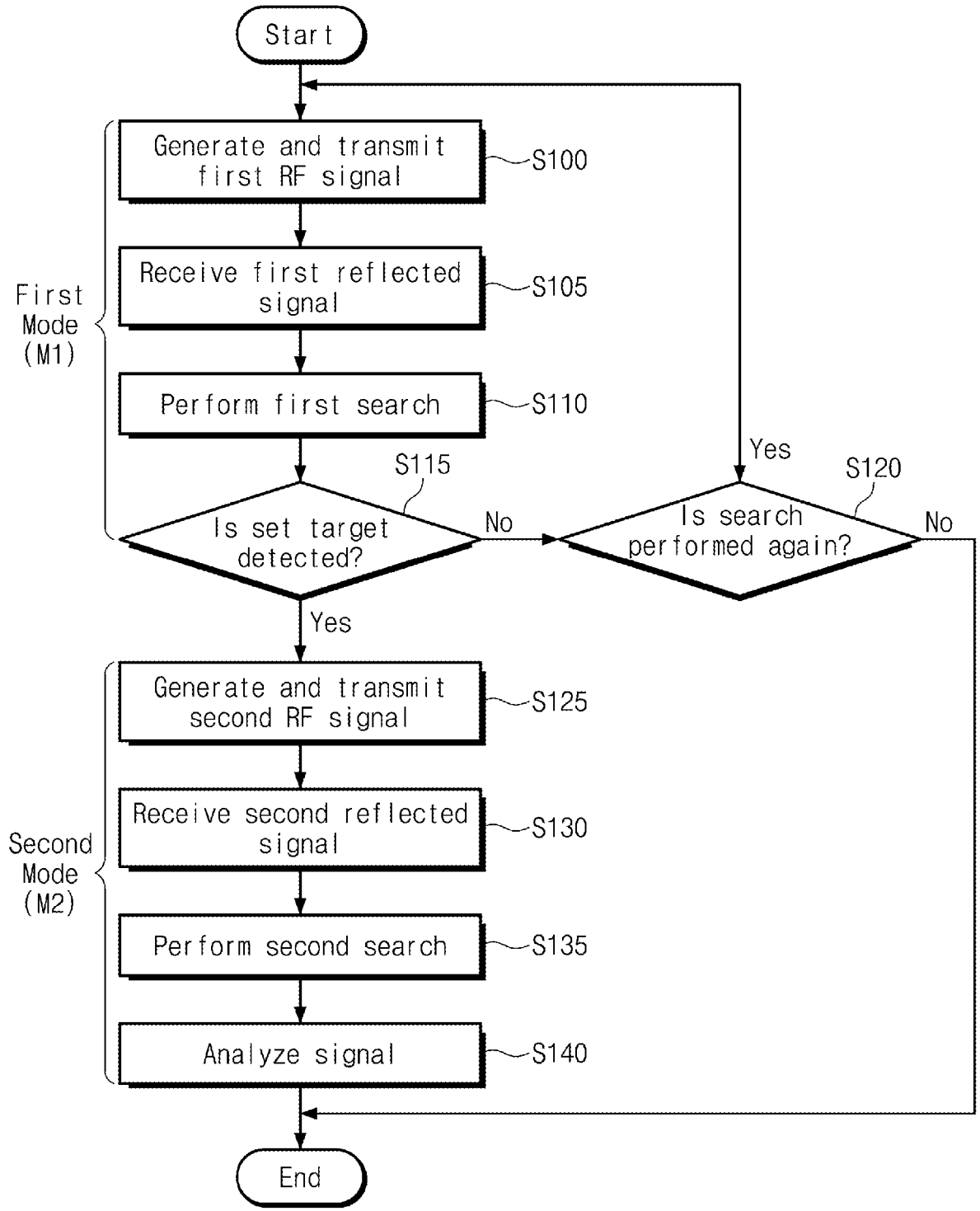
FIG. 4 is a flowchart illustrating a method of operating a radar device according to an embodiment of the present disclosure.

FIG. 4 is a flowchart illustrating a method of operating a radar device according to an embodiment of the present disclosure. Referring to FIGS. 1 to 4, the radar device 10 may first operate in a first mode M1, and then operate in a second mode M2 when the set target is detected. Operations S100, S105, S110, S115, and S120 may be performed in the first mode M1. Operations S125, S130, S135, and S140 may be performed in the second mode M2.

In operation S100, the radar device 10 may generate the first RF signal and transmit it to an arbitrary external target. The first RF signal may be a signal whose duty cycle is adjusted to be less than or equal to the reference value. For example, the radar device 10 may control the first RF signal to have a duty cycle of 10%. The radar device 10 may convert the first RF signal into the analog signal, may amplify the power of the analog signal, and may radiate it toward the arbitrary external target.

In operation S105, the radar device 10 may receive the first reflected signal from the arbitrary target. The first reflected signal may be a signal from which the first RF signal is reflected from the arbitrary target. In operation S110, the radar device 10 may perform a first search. The first search may mean signal processing for the first reflected signal. For example, the first search may include the coarse search according to FIG. 3. The radar device 10 may obtain the first range information for an arbitrary target from the first reflected signal through the first search.

In operation S115, the radar device 10 may determine whether the set target is detected based on the first range information. For example, the radar device 10 may determine whether the arbitrary target moves through the first range information, and when the arbitrary target moves, may determine that the set target is detected.

When determining that the set target is not detected, the radar device 10 may proceed to operation S120. In operation S120, the radar device 10 may determine whether the search should be performed again. The radar device 10 may return to operation S100 when the search is performed again, and may end the operation when the search is not performed again.

When determining that the set target is detected, the radar device 10 may proceed to operation S125. That is, when determining that the set target is detected, the radar device 10 may enter the second step. In operation S125, the radar device 10 may generate the second RF signal and may transmit it to the external set target.

In operation S130, the radar device 10 may receive the second reflected signal reflected from the set target. The second reflected signal may be a signal from which the first RF signal is reflected from the set target. In operation S135, the radar device 10 may perform a second search. The second search may mean signal processing for the second reflected signal. For example, the second search may include the fine search according to FIG. 3. The radar device 10 may obtain the second range information and the velocity information associated with the set target from the second reflected signal through the second search.

In operation S140, the radar device 10 may analyze the output signal. The output signal may include the second range information and the velocity information associated with the set target. The radar device 10 may measure the bio-signal of the set target by analyzing the output signal. For example, the bio-signal may include respiration, heart, or pulse of the set target. The radar device 10 may measure the respiration rate, heart rate, or pulse rate of the set target from the output signal, and may display the measured respiration rate, heart rate, or pulse rate information.

Figure 5:
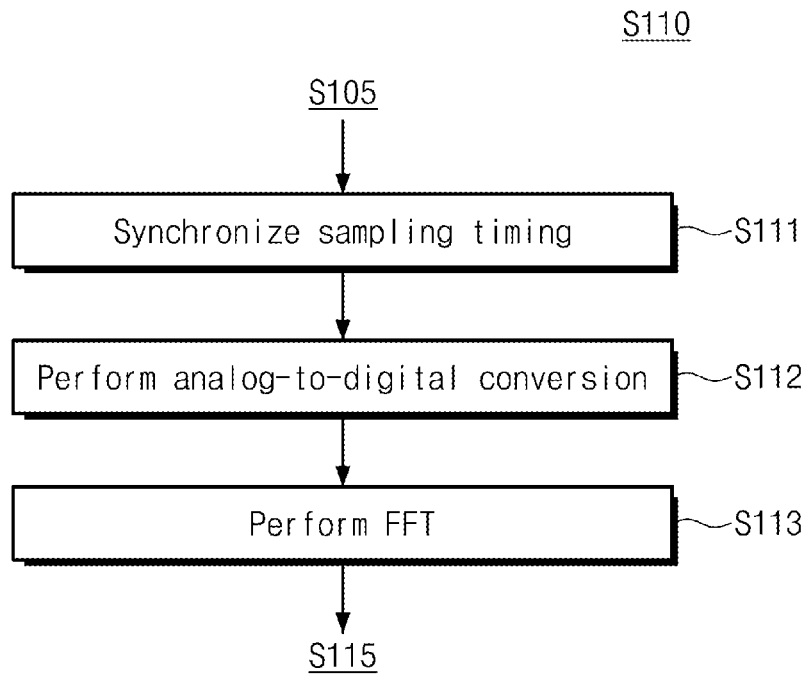
FIG. 5 is a flowchart illustrating operation S110 of FIG. 4 in detail.

FIG. 5 is a flowchart illustrating operation S110 of FIG. 4 in detail. Referring to FIGS. 1, 4, and 5, in operation S110, the radar device 10 may obtain the first range information for the arbitrary target from the first reflected signal through the first search.

In detail, in operation S111, the radar device 10 may synchronize the sampling timing. For example, the radar device 10 may synchronize the timing corresponding to the duty cycle of the first RF signal with the sampling timing of the first reflected signal. The timing corresponding to the duty cycle is a timing at which the first RF signal is turned on and will be described later with reference to FIG. 6.

In operation S112, the radar device 10 may perform analog-to-digital conversion on the first reflected signal. The radar device 10 may sample the first reflected signal based on the synchronized sampling timing in operation S111 and may convert the first reflected signal into the digital signal SIG_D.

In operation S113, the radar device 10 may generate the transformed signal SIG_T by performing fast Fourier transform on the digital signal SIG_D. The transformed signal SIG_T may include the first range information associated with the arbitrary target. The radar device 10 may determine whether to enter the second mode based on the first range information associated with the arbitrary target.

Figure 6:
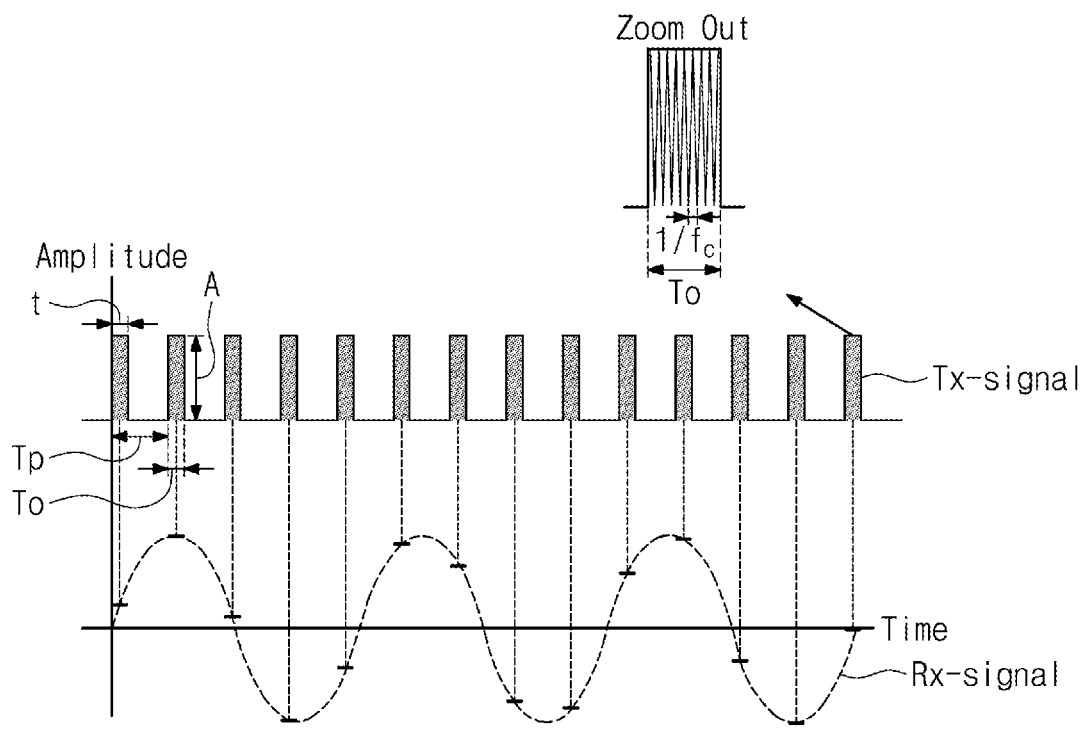
FIG. 6 is a diagram describing how signal processing according to a first mode of FIG. 4 is performed.

FIG. 6 is a diagram describing how signal processing according to a first mode of FIG. 4 is performed. Referring to FIGS. 1, 4, and 6, the radar device 10 may transmit the first RF signal in the first mode. A transmission signal (Tx-signal) is the first RF signal whose duty cycle is adjusted, and may be a signal of a low duty Doppler radar.

The radar device 10 may control the duty cycle by adjusting on/off time of the first RF signal. The radar device 10 may reduce power consumption by adjusting the duty cycle of the first RF signal and transmitting the transmission signal (Tx-signal).

The transmission signal (Tx-signal) may have a duty cycle and amplitude 'A' of set values. The duty cycle may be expressed as To/Tp. 'To' is a time during which the first RF signal is turned on, and 'Tp' is a period in which the first RF signal is turned on. That is, the duty cycle may mean a ratio of a time 'To' during which the first RF signal is turned on in the period 'Tp' in which the first RF signal is turned on. For example, when the period 'Tp' is 1 ms and the duty cycle is 10%, the time 'To' for which the first RF signal is turned on may be 100 µs.

The duty cycle may be controlled to be less than 10% depending on the application field of the radar device 10 and the surrounding environment at the time of use. In particular, in an urgent situation such as a disaster area, since battery consumption greatly affects location search and human detection, it may be important to lower the power consumption of the radar device 10 by controlling the duty cycle to be smaller.

When the part to which the duty cycle is applied is enlarged (zoom out), a signal having the same amplitude 'A' may appear continuously according to a period '1/fc'. This may be the first RF signal. That is, the signal to which the duty cycle is applied in the continuous first RF signal may be the transmission signal (Tx-signal).

A receiving signal (Rx-signal) may be a reflected signal reflected from the arbitrary target. The reflected signal may also have a uniform period and waveform. The receiver may convert the reflected signal to analog to digital. In this case, it may be necessary to synchronize the sampling timing.

Synchronization of the sampling timing may mean matching the sampling timing to the timing of the duty cycle. In detail, the sampling timing may correspond to a time 'To' during which the first RF signal is turned on. For example, the reflected signal may be sampled at a timing corresponding to the center of the time 'To' during which the first RF signal is turned on. In this case, the period of the sampling timing may be the same as the period 'Tp' in which the first RF signal is turned on.

As a result, the sampled digital signal may be effective only in a specific portion in which the first RF signal is turned on according to time change. The radar device 10 may perform the fast Fourier transform on such the digital signal to obtain the coarse information such as the movement with respect to the target.

Figure 7:
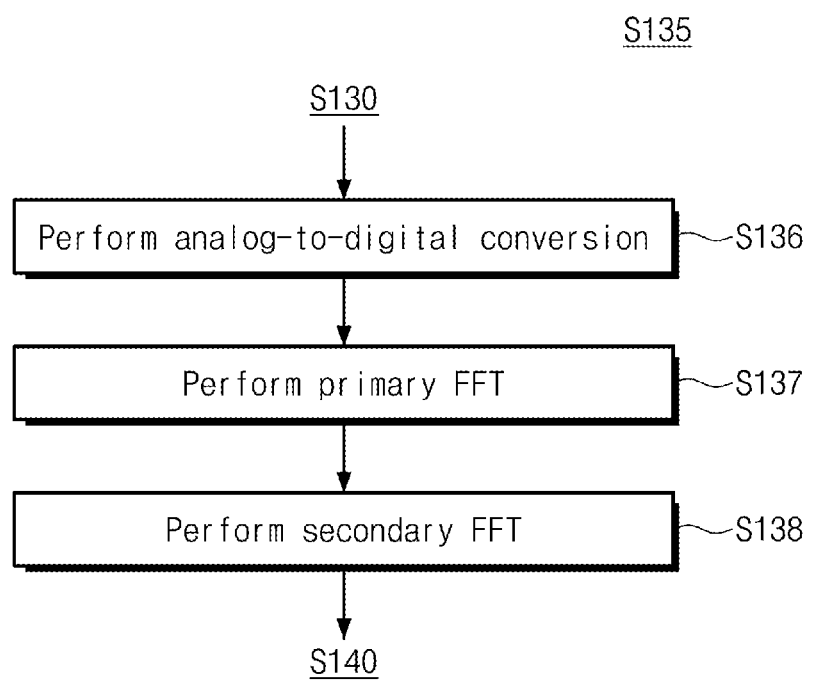
FIG. 7 is a flowchart illustrating operation S135 of FIG. 4 in detail.

FIG. 7 is a flowchart illustrating operation S135 of FIG. 4 in detail. Referring to FIGS. 1, 4, and 7, in operation S135, the radar device 10 may obtain the second range information and the velocity information associated with the set target from the second reflected signal through the second search.

In operation S136, the radar device 10 may perform analog-to-digital conversion on the second reflected signal. In detail, the radar device 10 may sample the intermediate frequency signal that is down-converted by mixing the second RF signal and the second reflected signal, and may convert it into the digital signal SIG_D.

In operation S137, the radar device 10 may generate the first bit signal by performing the primary fast Fourier transform on the digital signal SIG_D. The first bit signal may include the second range information associated with the set target. The second range information obtained in the second mode may be more accurate than the first range information obtained in the first mode.

In operation S138, the radar device 10 may generate the second bit signal by performing the secondary fast Fourier transform on the first bit signal. The second bit signal may include the velocity information associated with the set target. The radar device 10 may generate the output signal SIG_O including the second range information and the velocity information associated with the set target.

Figure 8:
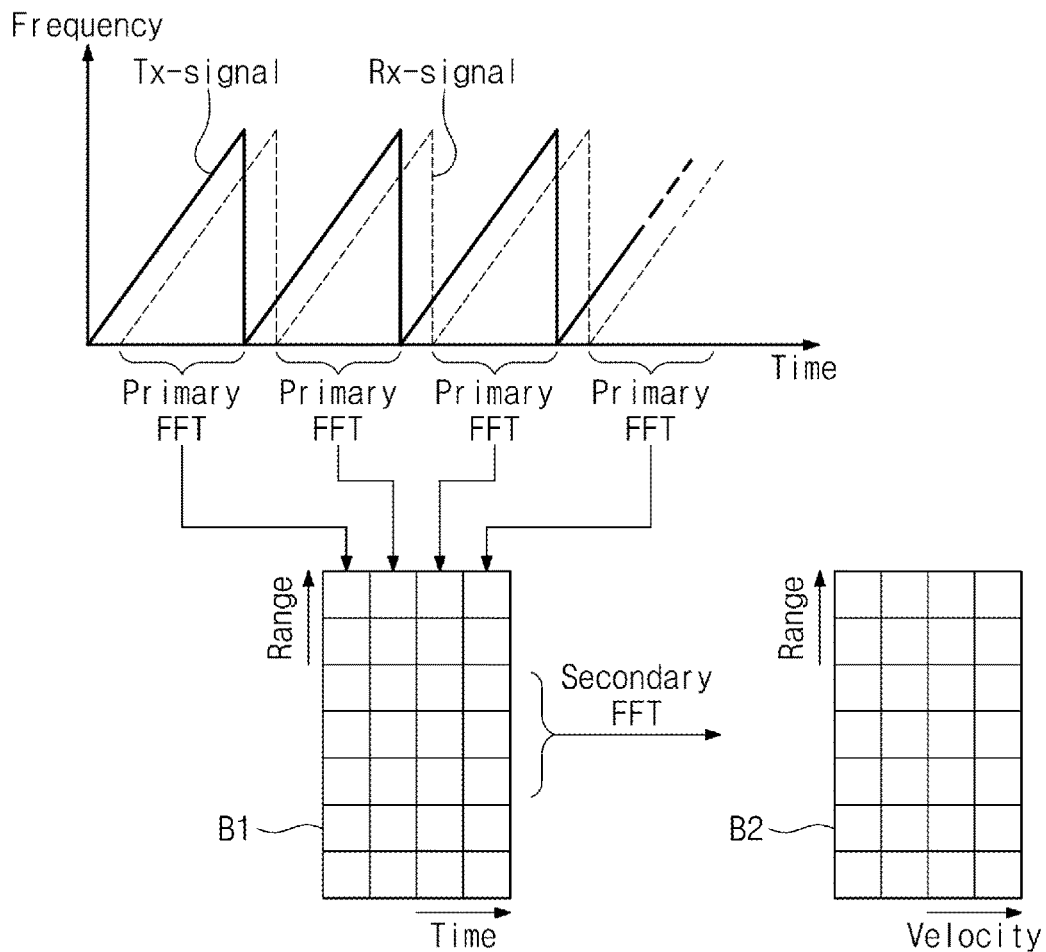
FIG. 8 is a diagram describing how signal processing according to a second mode of FIG. 4 is performed.

FIG. 8 is a diagram describing how signal processing according to a second mode of FIG. 4 is performed. Referring to FIGS. 4, and 8, the radar device 10 may transmit the second RF signal in the second mode. The second RF signal may be generated as a repetitive ramp signal. When the ramp signal whose voltage magnitude is linearly changed is input to the voltage controlled oscillator, the voltage controlled oscillator may output the transmission signal (Tx-signal) having a linear frequency in FIG. 8 according to the input linear voltage. That is, the transmission signal (Tx-signal) may be the FMCW radar signal.

The radar device 10 may transmit the transmission signal (Tx-signal) having a uniform pulse repetition interval (PRI) and then may receive the reception signal (Rx-signal) that is reflected from the target to obtain the range information and the velocity information through the two-step fast Fourier transform.

The radar device 10 may convert the intermediate frequency signal in which the transmission signal (Tx-signal) and the reception signal (Rx-signal) are mixed into a digital signal, and may perform a primary fast Fourier transform on the digital signal in units of the PRI. The radar device 10 may obtain first bit data B1 as a result of the primary fast Fourier transform, and the first bit data B1 may include the range data that are coefficient values for each range index.

The radar device 10 may perform the secondary fast Fourier transform on the range data having the same range index. The radar device 10 may obtain second bit data B2 as a result of the secondary fast Fourier transform, and the second bit data B2 may include the range data that are coefficient values for each range index and the velocity data that are coefficient values for each velocity index.

That is, the radar device 10 may obtain the range information through the primary fast Fourier transform, and may obtain the velocity information by performing the secondary fast Fourier transform on the result of the primary fast Fourier transform stored for each PRI.

In the frequency modulation method according to the second mode, a process gain may be increased while performing two fast Fourier transforms, and noise may be widely spread over the frequency band. Accordingly, in the second mode, the radar device 10 may relatively accurately detect the reflected signal of the moving or acting target. In addition, even if there are many fixed reflectors around, since a signal-to-noise ratio (SNR) is relatively large, it may be advantageous for detecting and measuring weak signals.

Figure 9:
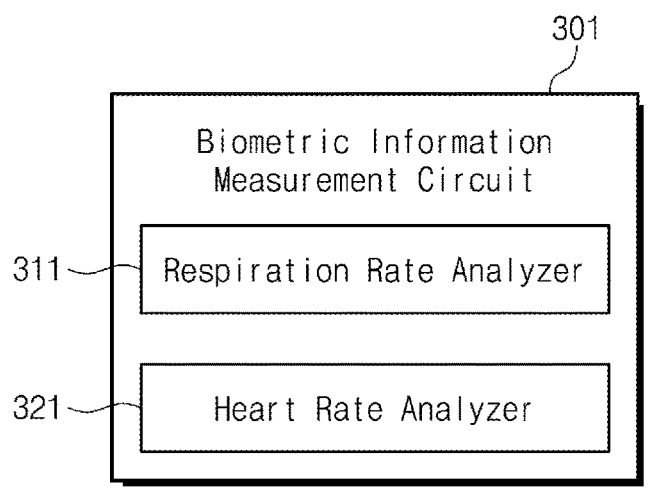
FIG. 9 is a block diagram illustrating a signal analysis circuit according to FIG. 1.

FIG. 9 is a block diagram illustrating a signal analysis circuit according to FIG. 1. Referring to FIG. 9, the signal analysis circuit 300 may include a biometric information measurement circuit 301. The biometric information measurement circuit 301 may include a respiration rate analyzer 311 and a heart rate analyzer 321.

The respiration rate analyzer 311 may analyze the respiration rate based on the signal detected for a predetermined time in the first frequency band based on the output signal SIG_O. For example, since a normal respiration rate corresponds to 0.1 to 0.33 Hz, the respiration rate analyzer 311 may calculate the respiration rate based on the signal detected during a detection time of at least 10 seconds, which may reliably include one cycle of respiration.

The heart rate analyzer 321 may analyze the heart rate based on the signal detected for a predetermined time in the second frequency band based on the output signal SIG_O. For example, since a normal heart rate is close to 1.26 Hz, the heart rate analyzer 321 may calculate the heart rate based on the signal detected during a detection time of at least 5 seconds, which may reliably include one cycle of the heartbeat.

In the case of human respiration or heartbeat, it may be necessary to detect a signal for a specific time or longer for signal analysis and processing. For example, the reflected signal should be continuously detected for at least 5 seconds. Therefore, when the reflected signal is detected only with the FMCW radar signal of the second mode without the first mode, power consumption may increase, and accordingly, the coarse search through the first mode operating at the low duty needs to be prioritized.

Figure 10:
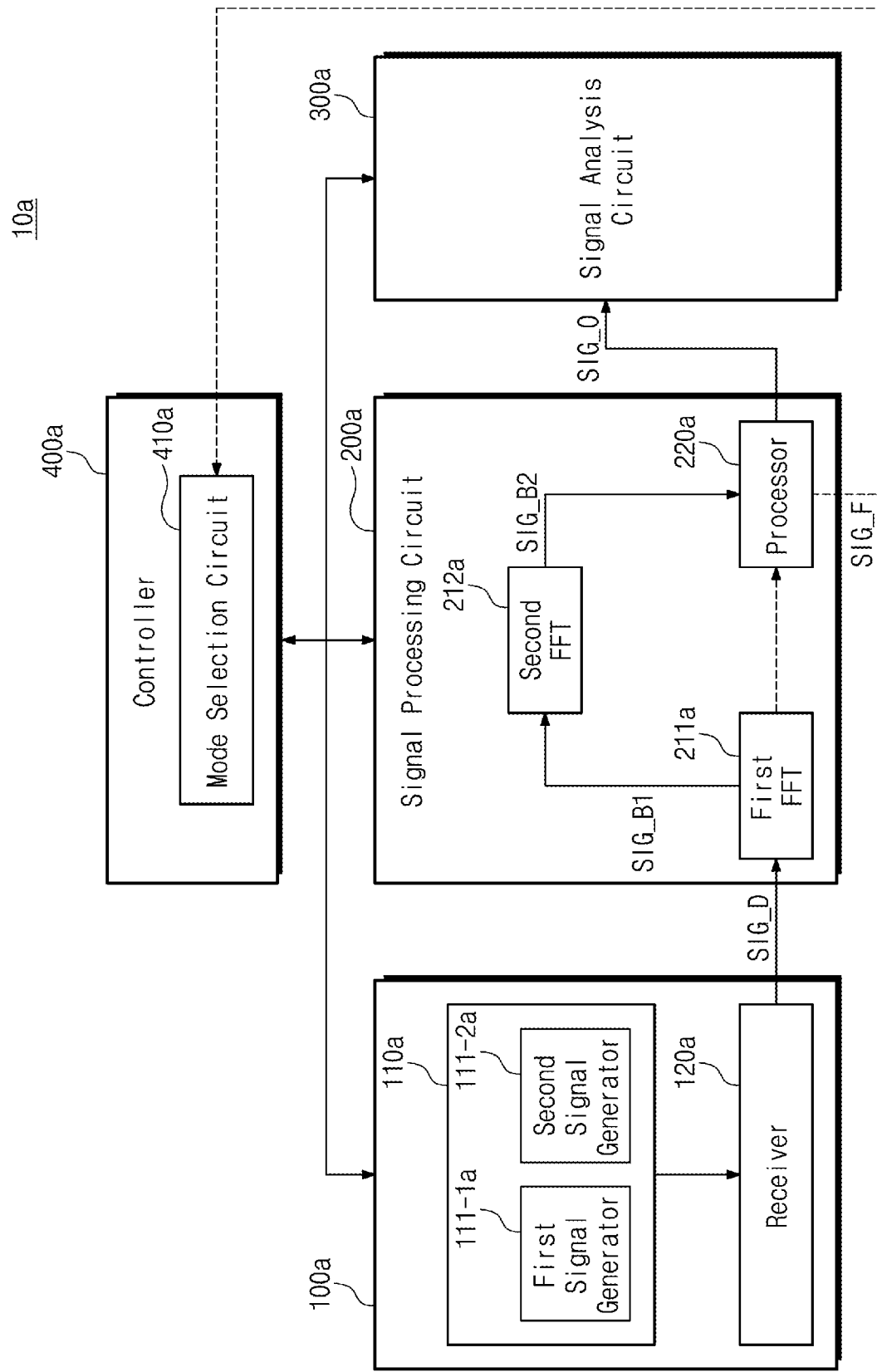
FIG. 10 is a block diagram of a radar device according to an embodiment of the present disclosure.

FIG. 10 is a block diagram of a radar device according to an embodiment of the present disclosure. Referring to FIGS. 1 and 10, a radar device 10a may include a transceiver 100a, a signal processing circuit 200a, a signal analysis circuit 300a, and a controller 400a. The transceiver 100a may include a transmitter 110a and a receiver 120a. The transmitter 110a may include a first signal generator 111-1a and a second signal generator 111-2a. The transmitter 110a may receive the reflected signal from the target, may perform analog-to-digital conversion, and may transmit the digital signal SIG_D to the signal processing circuit 200a.

The signal processing circuit 200a may include a first fast Fourier transformer 211a, a second fast Fourier transformer 212a, and a processor 220a. The signal processing circuit 200a may process the digital signal SIG_D along the first path path_1 in the first mode. The signal processing circuit 200a may process the digital signal SIG_D along the second path path_2 in the first mode. The processor 220a may provide the output signal SIG_O to the signal analysis circuit 300a. The controller 400a may include a mode selection circuit 410a.

Since the transceiver 100a, the signal processing circuit 200a, the signal analysis circuit 300a, and the controller 400a are similar to the transceiver 100, the signal processing circuit 200, the signal analysis circuit 300, and the controller 400 of FIGS. 1 to 3, additional description thereof will be omitted to avoid redundancy.

The processor 220a may generate the feedback signal SIG_F when the set target in the first mode is detected. The feedback signal SIG_F may be a signal for entering the second mode. The feedback signal SIG_F may be a signal for requesting selection of the second mode. The processor 220a may provide the feedback signal SIG_F to the mode selection circuit 410a. The mode selection circuit 410a may activate the second signal generator 111-2a in response to the feedback signal SIG_F.

According to an embodiment of the present disclosure, the radar device selectively controls a first mode for detecting an object based on a Doppler radar signal and a second mode for detecting an object based on a Frequency Modulated Continuous Wave (FMCW) radar signal, thereby minimizing power consumption for object detection and maintaining excellent detection performance even in a disaster environment with many obstacles. In addition, the size of the radar device may be reduced by implementing the device in a simple manner through a switch.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A radar device capable of operating in a dual mode, comprising:
    a transmitter configured to include a first signal generator that generates a Doppler radar signal and a second signal generator that generates a Frequency Modulated Continuous Wave (FMCW) radar signal, the first signal generator being separate from the second signal generator;
    a receiver configured to receive a reflected signal reflected from a target and to convert the reflected signal to a digital signal;
    a signal processing circuit configured to process the digital signal differently depending on the dual mode to output an output signal;
    a signal analysis circuit configured to analyze the output signal; and
    a controller configured to control operations of the transmitter, the receiver, the signal processing circuit, and the signal analysis circuit, and
    wherein the dual mode includes a first mode in which the first signal generator is activated to and a second mode in which the second signal generator is activated,
    wherein the controller includes a mode selection circuit configured to select the first mode or the second mode and to select the second mode when a set target is detected in the first mode, and wherein the signal processing circuit includes:
- a first fast Fourier transformer configured to generate a first bit signal including first range information by performing a primary fast Fourier transform on the digital signal;
- a second fast Fourier transformer configured to generate a second bit signal including second range information and velocity information by performing a secondary fast Fourier transform on the first bit signal; and
- a processor configured to receive the first bit signal in the first mode and to receive the second bit signal in the second mode.

2. The radar device of claim 1, wherein the first signal generator includes a duty cycle controller, and wherein the duty cycle controller is configured to adjust a duty cycle of the Doppler radar signal such that the first signal generator operates in a low-duty mode in the first mode.

3. The radar device of claim 2, wherein the receiver includes an analog-to-digital converter configured to convert the reflected signal into the digital signal, and wherein the analog-to-digital converter is configured to sample the reflected signal at a timing corresponding to the duty cycle.

4. The radar device of claim 3, further comprising:
a synchronization controller configured to synchronize the timing corresponding to the duty cycle with a sampling timing for sampling the reflected signal.

5. The radar device of claim 1, wherein the transmitter further includes a switch selectively connected to the first signal generator or the second signal generator, and wherein the switch is connected to the first signal generator in the first mode or connected to the second signal generator in the second mode by a control signal of the controller.

6. The radar device of claim 1, wherein the first fast Fourier transformer is configured to transfer the first bit signal to the processor in the first mode, and transfer the first bit signal to the secondary fast Fourier transformer in the second mode.

7. The radar device of claim 1, wherein the processor is configured to detect the set target in response to the first bit signal, and generate a feedback signal for requesting an activation of the second signal generator when the set target is detected.

8. The radar device of claim 7, wherein the feedback signal is transferred to the second signal generator or transferred to the controller to induce an entry into the second mode.

9. The radar device of claim 1, wherein the processor is configured to generate the output signal including the range information and the velocity information in response to the second bit signal.

10. The radar device of claim 1, wherein the second signal generator outputs the FMCW radar signal for a preset time, and wherein the signal analysis circuit includes a biometric information measuring circuit configured to analyze respiration rate information or heart rate information of the set target from the output signal based on the FMCW radar signal.

11. A transceiver capable of operating in a dual mode, comprising:

a transmitter including a first signal generator that generates a Doppler radar signal and a second signal generator that generates a Frequency Modulated Continuous Wave (FMCW) radar signal, and configured to activate the first signal generator in a first mode to output the Doppler radar signal, and to activate the second signal generator in a second mode to output the FMCW radar signal, the first signal generator being separate from the second signal generator; and a receiver configured to receive a reflected signal reflected from a target and to convert the reflected signal to a digital signal, and wherein the first signal generator includes a duty cycle controller configured to adjust a duty cycle of the Doppler radar signal to operate in a low-duty mode in the first mode, and wherein the first signal generator and the second signal generator are selectively activated according to a selected mode between the first mode and the second mode, and the second mode is selected when a set target is detected in the first mode, and wherein the receiver receives a first reflected signal to obtain first range information associated with an arbitrary target in the first mode, and receives a second reflected signal to obtain second range information and velocity information associated with the set target.

12. The transceiver of claim 11, wherein the transmitter further includes a switch selectively connected to the first signal generator or the second signal generator, and wherein the switch is connected to the first signal generator in the first mode or connected to the second signal generator in the second mode.

13. The transceiver of claim 11, further comprising:
a synchronization controller configured to synchronize a timing corresponding to the duty cycle with a sampling timing for converting the reflected signal into the digital signal.

14. A method of operating a radar device, comprising:
adjusting, in a first mode, a duty cycle of a Doppler radar signal generated by a first signal generator;
transmitting the Doppler radar signal to an arbitrary target;
receiving a first reflected signal of the Doppler radar signal reflected from the arbitrary target;
processing the first reflected signal to obtain first range information associated with the arbitrary target;
entering a second mode when it is determined that the arbitrary target is a set target based on the first range information;
transmitting, in the second mode, a Frequency Modulated Continuous Wave (FMCW) radar signal generated by a second signal generator, to the set target, the first signal generator being separate from the second signal generator;
receiving a second reflected signal of the FMCW radar signal reflected from the set target; and
processing the second reflected signal to obtain second range information and velocity information associated with the set target.

15. The method of claim 14, wherein the processing of the first reflected signal to obtain the first range information associated with the arbitrary target includes:
synchronizing a timing corresponding to the duty cycle with a sampling timing of the first reflected signal;
converting the first reflected signal into a digital signal depending on the sampling timing; and
performing a fast Fourier transform on the digital signal.

16. The method of claim 14, wherein the processing of the second reflected signal to obtain the second range information and the velocity information associated with the set target includes;
- converting the second reflected signal into a digital signal;
- generating a first bit signal by performing a primary fast Fourier transform on the digital signal; and
- generating a second bit signal by performing a secondary fast Fourier transform on the first bit signal.

17. The method of claim 16, wherein the first bit signal includes the second range information,
- wherein the second bit signal includes the velocity information, and
- wherein the second range information has higher accuracy than the first range information.

18. The method of claim 14, wherein the second RF signal is transmitted for a predetermined time, and
further comprising:
- measuring a respiration rate or a heart rate of the set target based on a specific frequency band of the second reflected signal received for the predetermined time.

* * * * *